United States Patent Office 2,962,483
Patented Nov. 29, 1960

2,962,483
POLYMERIZATION OF POLYVINYL CHLORIDE-POLYVINYL ACETATE COPOLYMER

Albert J. Haefner and Percy W. Trotter, Baton Rouge, La., assignors to Ethyl Corporation, New York, N.Y., a corporation of Delaware No Drawing. Filed Apr. 29, 1957, Ser. No. 655,469

1 Claim. (Cl. 260—87.1)

This invention relates to a new and improved process for manufacture, by a suspension process, of a highly desirable copolymer of vinyl chloride and vinyl acetate. More specifically, the invention relates to a process for such polymers having minor quantities of polyvinyl acetate component, and being particularly suited for injection molding and for record stock purposes.

Copolymers of vinyl chloride and vinyl acetate are well known as suitable for certain applications requiring moderate or low molecular weight polymers. The major application or usages of such polymer base is in the preparation of molding stock for phonograph records, floor tile, and other instances where particularly good flow properties are present, as well as a high degree of heat stability, and ultimate molded article strength. Up to the present time, it has been believed that in order to produce copolymer resins for such purposes that a solution type polymerization process was essential. In addition, it has been believed that elevated temperatures, of the order of 60 to 70° C., were unsuitable for two major reasons, viz., high temperature usually strongly adversely affects the heat resistant characters of the copolymer product, and, secondly, high temperature polymerizations of predominantly vinyl chloride monomer tends to become uncontrollable. Further, although the resins of the desired compositions and properties, which have been heretofore made, have been suitable for end use (insofar as the desired product atributes are concerned), nevertheless, they have exhibited certain profound disadvantages. Particularly, an intermediate step was considered essential which the present process renders unnecessary. This intermediate step is the intensification or milling, followed by pelletizing, of the copolymer heretofore used in the preparation of actual molding stock. It is, of course, known that a final molding powder includes not only the copolymer or polymer component, but in addition a stabilizing agent, and usually a pigment, a lubricant material, and a mechanical strengthening agent of one variety or another.

The objects of the present invention include the provision of a new and improved copolymerization process employing a suspension technique for the manufacture of vinyl chloride-vinyl acetate copolymers. A further and more explicit object is to provide a new and more rapid copolymerization process employing a suspension method which provides a highly desirable product polymer, easily separated from the polymerization reaction mixture. A further object is to provide a copolymer susceptible of "dry blending" with other desired components of a molding powder without an intermediate intensification step. A further and explicit object is to provide a polymer as above stated having highly desirable flow characteristics for relatively low temperature molding in applications wherein extreme precision of product delineation is necessary, and further exhibiting a high and effective degree of heat stability and mechanical strength in ultimate usage. An additional object is to provide a particular "recipe" and method of polymerization for attainment of the foregoing objects. Other objects will appear hereinafter.

In its broadest sense, the present invention includes a process for the suspension polymerization of vinyl chloride and vinyl acetate at a temperature of about 60 to about 70° C. although some latitude about said temperature range is permissible. The process is carried out with vinyl acetate in the proportions of from about one-eighth to one-fifth of the initial charge of monomer components or from about 4 to 7 parts of vinyl chloride to one part vinyl acetate. However, a preferred range is vinyl acetate at a concentration of from about 16 to 19 weight percent of the monomer feed. The polymerization is carried out in the presence of a substantial amount of an aqueous phase, the water being at least about twofold the weight of the monomer charge components. In addition to the monomer components and the water suspension polymerization medium, a peroxide type catalyst is used, of the oil soluble type. In addition, a water soluble synthetic emulsifying agent, and a water soluble, stabilizing, hydrophilic colloid is employed. A further feature of the present invention, particularly in the lower portions of the indicated polymerization temperature range, is the use of an additive consisting of a small amount of carbon tetrachloride, customarily from about one to about five parts per 100 parts of the total monomer components charged. The feed materials to the process, specifically the water, the vinyl chloride, and the vinyl acetate require rather closely controlled specifications. In some cases, as described hereinafter, special pretreatment of the materials is occasionally necessary to obtain satisfactory processing characteristics.

The details of and scope of the invention in the present process will be clearly understood from the following examples and detailed description hereinafter.

EXAMPLE I

The process is exemplified by the present example. In this illustration, as in succeeding examples, all parts or proportions are in parts by weight or weight percentages as indicated, except where otherwise specified.

To a glass-lined polymerization vessel, provided with a heat transfer jacket and appropriate agitation means was charged about 225 parts of deionized water. A water soluble hydrophilic colloid feed was prepared, using methyl cellulose, prepared initially as a hot thin slurry by incremental mixing of hot water to the extent of about 1½ gal. of water per pound of methyl cellulose. The resultant slurry was stored for about one hour at 80–90° C. before use. Sufficient of this slurry to provide 0.15 part of methyl cellulose was provided and was added to and dissolved in the water already in the polymerization vessel. Also added to this solution is sufficient sodium salt of di-octyl sulfosuccinate to correspond to 0.3 part to 100 parts of monomer. Lastly, 0.15 part of lauroyl peroxide was added to the vessel.

Vinyl acetate and vinyl chloride were then added in the proportion of 17.5 parts and 82.5 parts, respectively, and the charge was ready for polymerization. Polymerization quality vinyl acetate and vinyl chloride, as described more fully below, were used. During the charging operations, special precautions were taken to prevent the inclusion of oxygen in the polymerization vessel free space; for example, the vessel was subjected to a high degree of vacuum and then was pressurized with vinyl chloride vapor. This purging operation was repeated several times to assure an oxygen free system.

Following the foregoing charging, the temperature of the autoclave was increased as rapidly as feasible to 70° C. and held at this temperature as closely as possible. The temperature increase is achieved by circulating hot water through the jacket. During this operation and the entire polymerization, the charge is agitated continuously. The agitation was sufficient to provide a Pfaudler Agitative Intensity Factor of, roughly, about 4. (See O. W. Green, Reprint No. 508 "Development of Pfaudler Agitation," September 1953, Pfaudler Co., Rochester, N.Y.)

Because of the volatility of the vinyl chloride and vinyl acetate monomer charge, the pressure immediately after attaining the foregoing temperature level was about 150 pounds per square inch guage. The foregoing conditions were maintained for about 4½ hours. During this period polymerization proceeded at a relatively rapid rate, and, owing to the consumption of the monomer charged, the pressure decreased somewhat, to about 100 pounds per square inch guage, at the close of the above period.

Upon termination of the foregoing polymerization cycle, the resultant slurry was transferred to a blow down tank under its own pressure as rapidly as possible. The temperature was then reduced to room temperature as rapidly as convenient.

Following attainment of moderate or room temperature, the slurry was filtered to separate the aqueous phase from the polymer particles. The resultant resin was washed with deionized water in generally the proportions of about one gallon of water to one pound of resin. The resin particles were dried in a tray dryer or similar device at 50 to 55° C. until the moisture content was reduced to below ½ weight percent.

The resultant resin produced by the forgoing procedure had properties as tabulated below:

| Property: | Average value |
|---|---|
| Intrinsic viscosity in cyclohexanone [1] | 0.56 |
| Bulk density, grams/ml. | 0.42 |
| Acetate content, weight percent | 14 |
| Heat stability at 300° F.[2] | 60 min. |
| Particle size, weight percent— | |
| On 40 mesh screen | 0 |
| On 100 mesh screen | 52 |
| On 140 mesh screen | 25 |
| On 200 mesh screen | 12 |
| On 230 mesh screen | 2 |
| Thru 230 mesh screen | 9 |

[1] Intrinsic viscosity is a viscosity value determined as follows. Efflux times from a viscometer are determined for a solution of the polymer in a specific solvent, and for the pure solvent. The ratio of the first to the second is the relative viscosity, and this, minus one, is the specific viscosity. The specific viscosity, divided by the polymer concentration in grams per 100 cc. of solution, is the reduced viscosity. The reduced viscosity, extrapolated to a zero concentration level, is the intrinsic viscosity.
[2] Heat stability is the time before yellowing of square specimens taken from a milled sheet made from a standard molding formulation containing the polymer. The molding formulation used included 100 parts resin, 2 parts commercial stabilizer, and 0.5 part hydroxy methyl stearate.

In addition to the above operation, it has been found that similar results can be achieved with respect to rapid polymerization time and desirable product properties, when operating at lower temperatures of the order of about 65° or even as low as 60°. It should be noted that heretofore it was believed that much lower temperatures of below 55° C. represented the maximum range suitable for polymerizations of this character.

As previously stated, numerous embodiments of the present process are carried out at lower temperatures than in the foregoing example, and with minor amounts of carbon tetrachloride added to the charge, as illustrated by the following example.

EXAMPLE II

The procedure of the foregoing example was repeated, with the same charge components, plus 1.6 parts of carbon tetrachloride. Instead of carrying out the polymerization at 70° C., however, a lower polymerization temperature, of 65° C. was used. The pressure was initially at 130 p.s.i.g., and polymerization was continued until the pressure dropped to 100 pounds, a polymerization time of five hours being required.

Tests of the polymer produced from this example showed that the properties were the same as those of the polymer from Example I.

When the catalyst concentration is increased appreciably over the proportion used in the foregoing example, the polymerization time is reduced, and there is a trend toward poorer heat stability. However, if the carbon tetrachloride additive is omitted, the product quality suffers somewhat in having a higher intrinsic viscosity and molecular weight, as illustrated by the following example.

EXAMPLE III

The same charging procedure and operating temperature as employed in the foregoing examples was repeated, but no carbon tetrachloride was used, the charge proportions and components being as follows:

| | Parts |
|---|---|
| Vinyl acetate | 15 |
| Vinyl chloride | 85 |
| Deionized water | 225 |
| Methyl cellulose | 0.055 |
| Sodium dioctyl sulfosuccinate | 0.10 |
| Lauroyl peroxide | 0.30 |

The polymerization was carried out at, initially, 130 pounds pressure, which dropped to about 100 pounds in 4 hours, and to 63 pounds in 4½ hours.

A high yield of polymer product was obtained, having properties generally similar to the properties of the product from the preceding example, but an intrinsic viscosity of 0.65, or about 16 percent greater than the viscosity of the product of Example II. The final polymer contained about 12.5 percent vinyl acetate component.

Generally, for the preferred uses of the copolymers of the present process, a somewhat lower intrinsic viscosity is preferred, because this attribute is intimately related to the ease of processing. When lower temperature operation is desired, coupled with a rapid rate of polymerization, this desired product can be achieved with a relatively high catalyst concentration plus a small amount of carbon tetrachloride, as in the following example.

EXAMPLE IV

The procedure and charge of Example III are repeated except that 1.6 parts of carbon tetrachloride are added. In this case a polymer with an intrinsic viscosity of about 0.56 is produced, and with other properties generally equivalent to the product from Example I.

The vinyl chloride monomer used should be polymerization grade preferably having the following specifications:

Acetylene content—less than 5 parts per million
Acetaldehyde content—less than 15 parts per million
Iron content—less than 0.5 part per million
Polymerization rate test—greater than 80% conversion in 5 hours The polymerization capacity test employed involves exposing a sample polymerization mix, of the composition given below, to a 40° C. temperature for the indicated time with suitable agitation and determining the degree of charge conversion to polymer:

*Test mix*

| | Parts |
|---|---|
| Distilled water | 170 |
| Sodium lauroyl sulfate | 0.75 |
| Potassium persulfate | 0.50 |
| Monomer | 50 |

The vinyl acetate monomer should be polymerization grade. If inhibited with hydroquinone the quantity thereof should be preferably less than 50 parts per million.

The vinyl chloride employed should desirably be inhibitor free, particularly with respect to the phenol content. The phenol content is preferably less than 10 p.p.m. When necessary this quality can be provided by treating the vinyl chloride monomer with an aqueous caustic wash, the caustic containing about 15 percent sodium hydroxide. Alternatively, the monomer can be distilled through a bed of fused caustic sticks.

Generally, the procedures described in the foregoing examples provide a polymer conversion of about 90 percent, with somewhat higher conversion of the vinyl chloride monomer component. It appears that despite the lower initial concentration of the vinyl acetate, the vinyl chloride is more readily copolymerized and hence the resultant resin is not identical in composition to the monomer components charged. Generally, then, even in situations where a polymerization time of over 4½ hours is employed, the polymerization is preferably continued only to the extent where conversions of about 90 percent or slightly above, are achieved. Hence, it is preferred in all cases to continue the polymerization until about 85 to 90 percent of the vinyl chloride has disappeared or has polymerized.

As will be evident from the preceding examples, the quantity of water employed is several fold the quantity of monomer components. If desired, this proportion can be as high as fourfold although no significant benefit is obtained by such high proportions. The proportions of the emulsifying agent and the hydrophilic colloid used should be increased when the proportions of water are greatly increased, but, in general, the proportions, relative to the monomer components, are as described in the examples and within the ranges mentioned below.

As already stated, the polymerization is carried out with an effective quantity of a water soluble, hydrophilic colloid, to function, in conjunction with the emulsifying agent, as a process stabilizing and anti-coagulation composition. Although methyl cellulose is a preferred component of this nature, numerous other components can be used with a similar degree of success. Among the readily available materials of this nature are soluble starch, gelatin, agar-agar, sodium alginate and carboxymethyl cellulose. When these materials are substituted for methyl cellulose in the preceding examples, similar results are provided. In the case of methyl cellulose, the preferred proportions are from about 0.05 to 0.2 part per 100 parts of the monomer weight charged.

Similarly to the permissible variation in the colloid, as above described, considerable latitude is permissible with respect to the emulsifying agent. The salts of sulfoalkylsuccinates are a preferred class of emulsifying, surface-active materials. However, when an equivalent amount of, for example, sorbitan monolaurate, or a polyethylene glycol of sorbitan monolaurate, monopalmitate, or monooleate, or cetyl dimethylbenzyl ammonium chloride, or polyethylene glycol ether of sorbitan monopalmitate, or various condensation products of ethylene glycol and fatty alcohols are substituted for the sodium dioctyl sulfosuccinates in the examples above, similar results are provided. The proportions of the emulsifying agent, in substantially all instances, lies in the range of about 0.1 to about 0.5 part, the preferred range for sodium dioctyl sulfosuccinate being from 0.2 to 0.4 part.

As previously described, in all forms of the present invention an elevated temperature of operation is used, in the range of about 60 to 70° C. When lower temperatures within this range are used, however, it is found that the peroxide catalyst concentration should be increased somewhat to provide a reasonable polymerization rate, and, in addition, a minor amount of carbon tetrachloride should be charged. The exact amounts of carbon tetrachloride employed will vary somewhat according to the operating temperature desired, but as shown by the examples, for a monomer charge containing about 17.5 percent of vinyl acetate, when operating at 70° C., no carbon tetrachloride is required. When operating, with the same monomer proportions, at 65° C., about 1.5–1.6 parts of carbon tetrachloride is used, and, at 60° C. about 4 parts.

The catalysts employed in the process are, as already indicated, oil soluble organic peroxides, lauroyl peroxide being preferred. Other catalysts of this character are benzoyl peroxide, acetyl peroxide, acetyl benzoyl peroxide, stearyl peroxide, caprylyl peroxide, cumene hydroperoxide, tertiary butyl hydroperoxide, di-isopropyl benzene hydroperoxide and paramenthane hydroperoxide. The concentration of the peroxide catalyst, based on the monomer charged to the process, should be equivalent to about 0.15 part lauroyl peroxide per 100 parts of monomer, and, for lower operating temperatures, up to an equivalent concentration of not over 0.5 part of lauroyl peroxide at an operating temperature of about 60° C. When a peroxide catalyst other than lauroyl peroxide is used, the proportions are adjusted generally in direct ratio to the molecular weight.

It is virtually essential that the polymerization be conducted in an oxygen-free environment. Hence, as deducted in connection with the examples, the reaction vessel and any mixing vessels employed prior to polymerization, should be very carefully purged for removal of oxygen bearing vapors.

In final product testing of copolymers produced by the present process, phonograph records were made by an injection molding process. Comparison of the properties of these records with records made from a commercial record molding powder showed the following results for the present polymer:

Equivalent ease of milling when compounding
Satisfactory heat stability
Satisfactory wear
Good tone and fidelity
Less surface noise
Impact strength equal to commercial resin
No blisters formed in molding
Substantially greater toughness and resistance to breakage In addition to the very satisfactory performance of the product of the present process in record molding, it was found that molding powder blends could be made readily by dry blending, that is, by plain mixing with other components such as a stabilizer and a lubricant wax. Dry blends so produced were readily extruded and injection molded.

We claim:

A suspension process for production of a heat stable, dry blendable, copolymer of vinyl chloride and vinyl acetate comprising forming a charge consisting of 100 parts by weight of a monomer portion including from about 16 to about 19 percent of vinyl acetate, and vinyl chloride; from 0.15 to 0.5 part of lauroyl peroxide, from 0.2 to 0.4 part of sodium-dioctyl sulfosuccinate, from 0.05 to 0.20 part of methyl cellulose, from about 1.5 to 4 parts of carbon tetrachloride and at least about 200 parts of water, and maintaining said charge at a temperature of from about 60° to about 65° C. under pressure and with agitation, and thereby polymerizing, and discontinuing the polymerization when major fractions of the vinyl chloride and vinyl acetate have copolymerized, and then recovering said polymer.

References Cited in the file of this patent

UNITED STATES PATENTS

| | | |
|---|---|---|
| 2,118,945 | Reppe et al. | May 31, 1938 |
| 2,342,918 | Busse | Feb. 29, 1944 |
| 2,388,601 | Collins | Nov. 6, 1945 |
| 2,422,646 | Starck et al. | June 17, 1947 |
| 2,470,909 | Baer | May 24, 1949 |
| 2,492,087 | Baer | Dec. 20, 1949 |
| 2,528,469 | Condo et al. | Oct. 31, 1950 |
| 2,689,836 | Bier | Sept. 21, 1954 |

FOREIGN PATENTS

| | | |
|---|---|---|
| 600,904 | Great Britain | May 9, 1944 |

OTHER REFERENCES

Simonds et al.: "Handbook of Plastics" (Princeton, N.J., D. Van Nostrand Company, Inc., 1949), pp. 439–441 only needed.